United States Patent [19]
Kratochvil et al.

[11] Patent Number: 5,167,590
[45] Date of Patent: Dec. 1, 1992

[54] GEARBOX, PREFERABLY A CYCLOIDAL ONE, FOR DIRECT CONNECTION WITH A DRIVING AND DRIVEN ELEMENT

[76] Inventors: Ervin Kratochvil, nám. Svobody 120, 664 56 Blucina; František Čáslava, Sabinova 6, 616 00 Brno; Jan Hykrda, Filipova 23, 635 00 Brno; Jan Drtil, Rokycanova 43, 615 00 Brno, all of Czechoslovakia

[21] Appl. No.: 761,233

[22] Filed: Sep. 17, 1991

[51] Int. Cl.$^5$ ............................................. F16H 1/28
[52] U.S. Cl. .................................. 475/178; 475/179
[58] Field of Search ............................. 475/178, 179

[56] References Cited

FOREIGN PATENT DOCUMENTS

| | | |
|---|---|---|
| 2835973 | 2/1980 | Fed. Rep. of Germany . |
| 59-113340 | 6/1984 | Japan .................................. 475/178 |
| 62-233540 | 10/1987 | Japan .................................. 475/178 |
| 63-83432 | 4/1988 | Japan .................................. 475/178 |
| 63-246534 | 10/1988 | Japan .................................. 475/178 |
| 1-15556 | 1/1989 | Japan .................................. 475/178 |
| 3-9147 | 1/1991 | Japan .................................. 475/178 |

Primary Examiner—Leslie A. Braun
Assistant Examiner—William O. Trousdell
Attorney, Agent, or Firm—Wigman & Cohen

[57] ABSTRACT

A gearbox 22 has a driving part 1 fixedly connected to an eccentric 2, on which circulates a planet wheel 3. The output driven body 11 of a cycloidal gearbox 22 is in the form of a disc and is provided with pins 10, which are engaged with a planet wheel 3. Between the surface at the circumference of a driven body 11 and an adjoining inner surface of a gearbox 22 case 7 at least one bearing 12 is arranged. In such a way is the axial dimension of a driving unit many times shorter, the weight of a gearbox and a quantity of work invested are smaller. A gearbox is preferably manufactured in one unit with a driving and driven elements, a case 7 being directly coupled to a driving element and said driven body 11 being directly coupled to a driven element.

7 Claims, 5 Drawing Sheets

GEARBOX, PREFERABLY A CYCLOIDAL ONE, FOR DIRECT CONNECTION WITH A DRIVING AND DRIVEN ELEMENT

TECHNICAL FIELD

The invention concerns a gearbox, especially a cykloidal one for direct transmission with a driving and driven element, the driving part of which is fixed to at least one eccentric, engaged with a pertinent plane wheel circling on said eccentric, where on the outer circumference of said planet wheel are periodically arranged teeth, usually in a form of a closed cycloid, which are engaged with pegs or pulleys arranged on a first hole circle and fixedly coupled to a gearbox case, every planet wheel being provided with holes, which are arranged on a second hole circle and which are engaged with carrier pins, said carrier pins being fixedly coupled to a rotatably seated driven body.

BACKGROUND

A cycloidal gearbox is a modern, compact transmission element providing a possibility of achieving big gear ratios. In comparison with other kinds of transmission gears the cycloidal gearbox has a high effectivity, high torque overload capacity, long service life, low noisiness, low weight and small built-in dimensions. A disadvantage of all prior art cycloidal gearboxes consists in that they have a realtively big axial dimension. This dimension is a consequence of their construction, where on the back side of a gearbox an input shaft is arranged, while on the front side an output shaft is arranged with the necessity of seating of the input shaft, and if need be even a seating of the output shaft in bearings, what is evident e.g. from DE PS No. 28 35 973, which is incorporated into this description as a reference. Such an arrangement of a gearbox does not allow its direct coupling, without a seating of its own, to a driven, ev. driving unit.

DISCLOSURE OF INVENTION

The above disadvantages are eliminated by a gearbox according to this invention, the substance of which consists in that the driven body is in a form of a disk, where between the surface at its circumference and an adjoining inner surface of the gearbox case at least one bearing is arranged, said driven body with fixedly connected pins being engaged with a planet wheel, circling on an eccentric.

Through such an arrangement of a gearbox according to this invention a reducing of its built-in dimensions, in particular of its axial dimension is achieved. The reducing of the axial dimension can reach a value up to one fourth to one sixth of the axial dimension of a gearbox of the prior art, a better compactness being thus achieved. It enables a direct mounting to a driven unit without further seating of this unit and without carrying out of an output shaft of a gearbox. It will enable its direct coupling to a driving unit. Further on the number of constructional units, quantity of work invested, production costs, material consumption and weight will be lower and hygiene and work safety shall increase.

MODE FOR CARRYING OUT INVENTION

A cycloidal gearbox can be constructed with one or more planet wheels. For achieving a high gear ratio it is possible to design it as a two- or more-stage gearbox. One stage provides a possibility of gear ratio up to 1:100.

Figure 1:
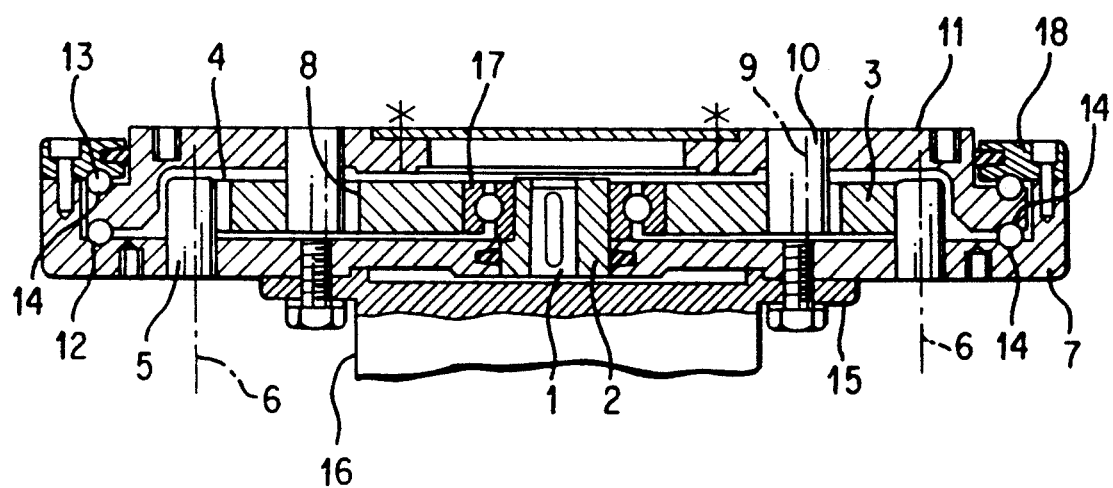
FIG. 1 is a front view of a cycloidal gearbox with one planet wheel, in a longitudinal section.
Figure 2:
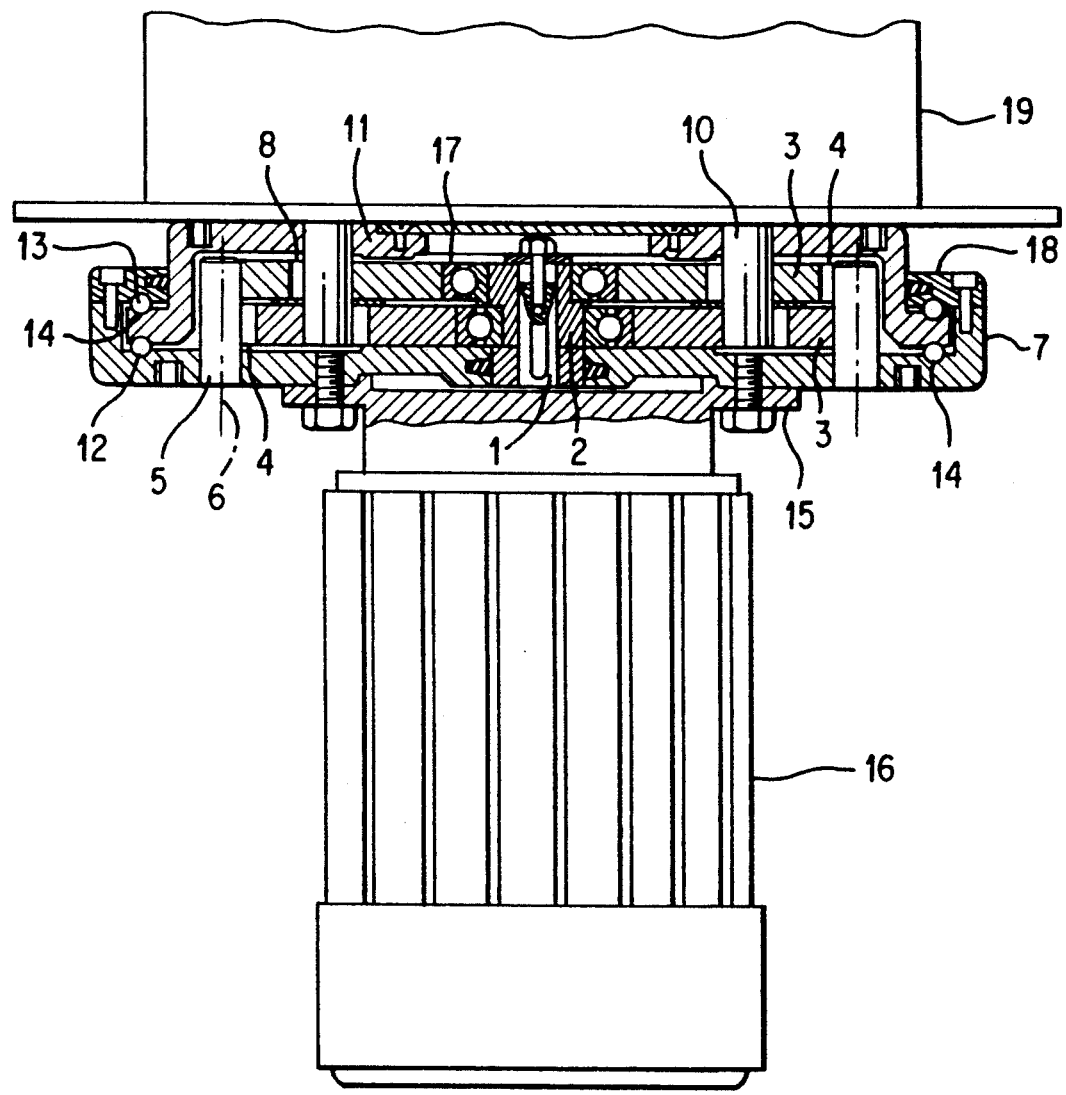
FIG. 2 is a front view of a cycloidal gearbox with two planet wheels, with a coupled driving flange-mounted motor and a driven cylinder, in a partly longitudinal section.
Figure 3:
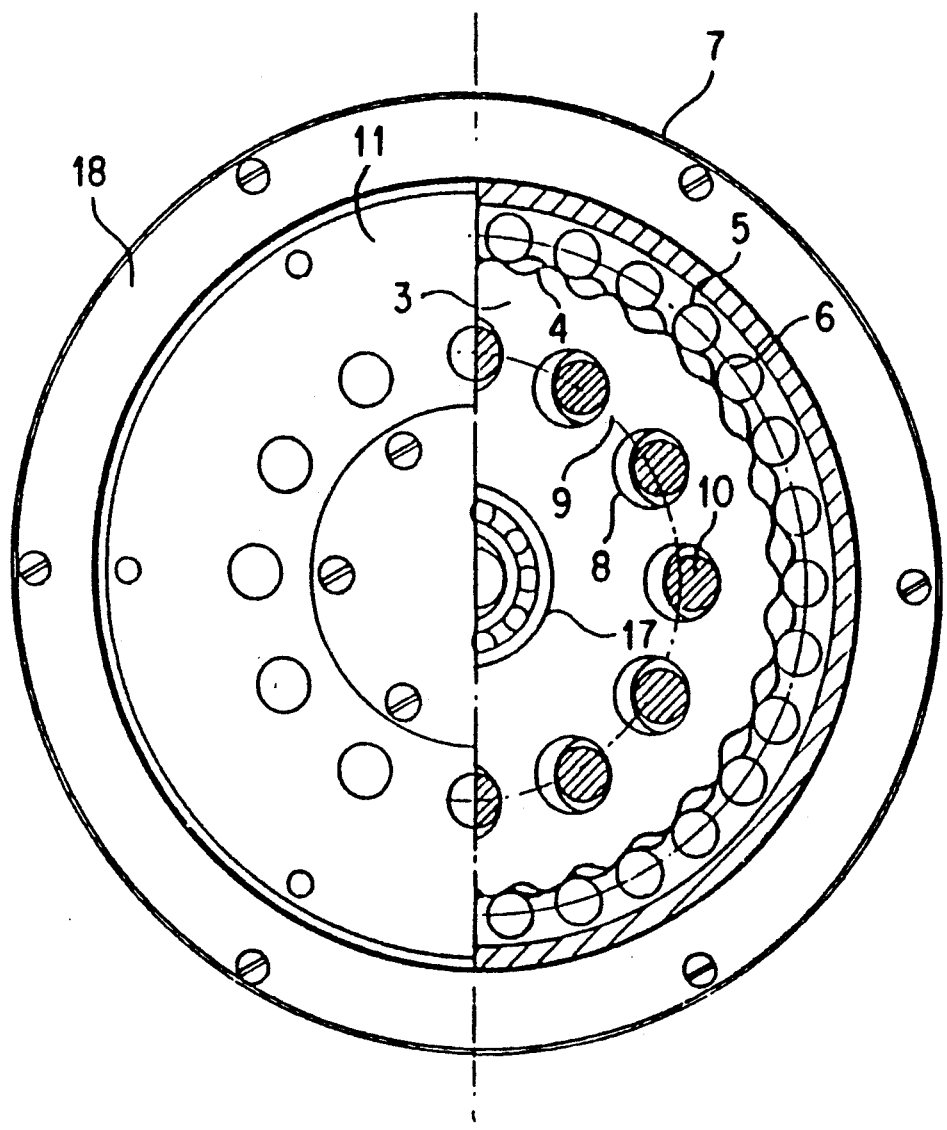
FIG. 3 is a plan view of a cycloidal gearbox in a partly transversal section.

The cycloidal gearboxes according to FIGS. 1, 2 and 3 have a case 7, to which a flange 15 of a driving electric motor with a brake is coupled, the output shaft of which forms at the same time a driven part 1, with which eccentrics 2 are engaged. Said eccentrics 2 are provided with second bearings 17, which are engaged with planet wheels 3, said planet wheels 3 being provided on their outer circumferences with periodically spaced teeth 4 in a form of a closed cycloid. The teeth 4 are engaged with pins 5, arranged on a first hole circle 6 and fixedly coupled to a case 7 of a cycloidal gearbox.

On a second hole circle 9 in said planet wheels 3 are arranged longitudinal holes 8, with which carrier pins 10 are engaged, said carrier pins 10 being fixedly connected to a driven body 11, which is rotatably seated in a bearing 12. Said bearing 12 is arranged in a radial plane over the outer circumference of a planet wheel 3 and is set up by rolling-contact elements 13 in a form of balls. Said elements 13 are rolling in annular recesses 14, arranged in side walls of said driven body 11, and in opposite inner walls of a cycloidal gearbox case 7 and of a closing circular ring 18. Said driven body 11 forms at the same time an output member of said cycloidal gearbox and is fixedly coupled with a cylinder 19 of a winch.

Figure 4:
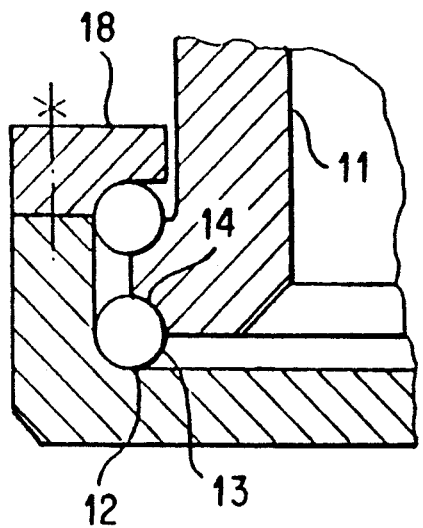
FIGS. 4, 5, 6 and 7 are details of arrangements of seatings of a driven body of a cycloidal gearbox, in a longitudinal section.

In a detail of a double-row ball radial thrust bearing 12 in FIG. 4 are in the circumferential part, at its side walls in an axial direction, formed annular rounded-off recesses 14 for guiding of balls 13, to which from the opposite side adjoin annular rounded-off surfaces of inner walls of said cycloidal gearbox case 7 and said closing circular ring 18 of said bearing 12.

Figure 5:
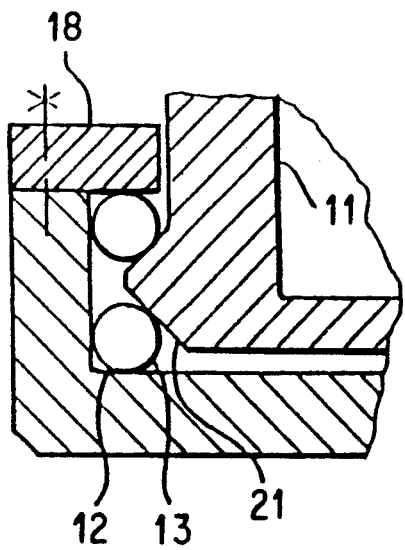

In a detail of a double-row ball radial thrust bearing 12 in FIG. 5 its balls 13 are from the inner side supported by a side wall of a comb 21 with a triangle cross section, formed as a ring on an outer circumference of said driven body 11. From the outer side are said balls 13 supported by adjoining inner walls of said case 7 and by said closing circular ring 18.

Figure 6:
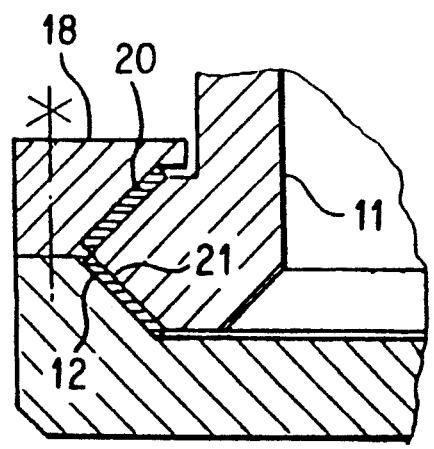

A part of a radial bearing 12 in FIG. 6 has sliding walls 20 arranged in a form of a dovetail formed by said closing circular ring 18, case 7 and comb 21 of said driven body 11.

Figure 7:
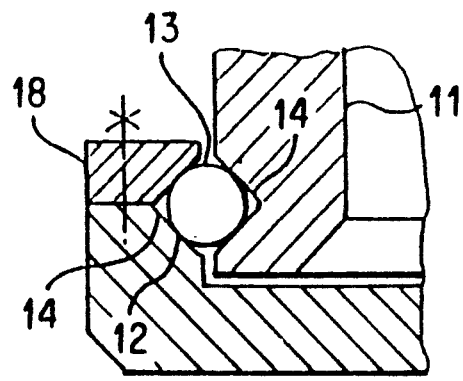

A single-row ball radial thrust bearing 12, depicted in detail in FIG. 7, has its balls 13 arranged in opposing annular recesses 14, which have the form of a letter V, the outer recess 14 being formed by edge bevels of an inner circumferential end of said case 7 and circular ring 18, and the inner recess 14 being arranged on an outer circumference of said driven body 11.

Figure 8:
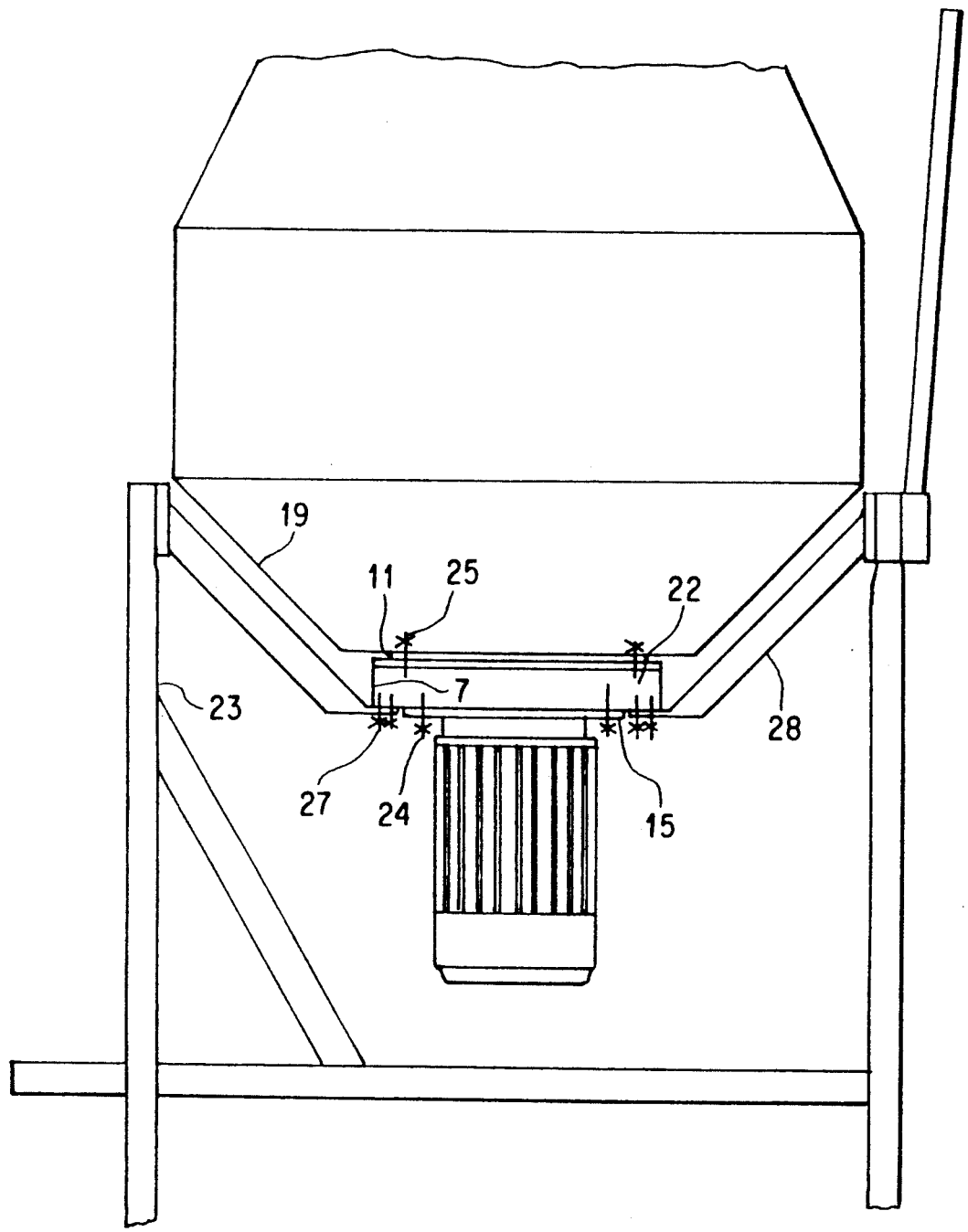
FIG. 8 is a front view of a cycloidal gearbox according to this invention mounted in a mortar mixer.

In FIG. 8 there is a cycloidal gearbox 22 designed in one piece with a driving flange-mounted motor 16, the flange 15 of which is coupled by first bolts 24 to its case 7, while to the output of said cycloidal gearbox 22, formed by a driven body 11, is directly coupled by second bolts 25 a cylinder 19 of a mortar mixer 26. The case 7 of the gearbox 22 is with the help of fixing means 27 coupled to a console 28, which is rotatably mounted in a frame 23 of a mortar mixer 26.

Other advantages of the cycloidal gearbox according to the invention include a small quantity of work invested, easy manufacture, easy assembly, undemanding servicing and maintenance and a possibility of using lines of unified parts which are available in the market, e.g. bearings 12, eventually their rolling bodies, as well as pins 5 and carrier pins 10, for its production.

New constructional arrangement of a gearbox according to the invention is in comparison with prior art cycloidal gearboxes in its axial direction many times shorter, up to four to six times, the output shaft being replaced by a driven body 11 in a form of a rotating disc, which is seated with the help of a special bearing 12 in the case 7 of said cycloidal gearbox. This feature predetermines it for direct coupling to a driven mechanism, without its special seating, especially for driving of different cylinders, crane crabs winches, mortar mixers, crushers, breakers, forming and assembling automatic machines, as well as for driving gears of manipulators, handling equipments and robots. It is suitable for step-up gear, e.g. through arranging it between a propeller and a driven generator of a wind power plant, where in this special case the driving part 1 is driven, output part of a gearbox, while the driven body 11 is a driving, input part of a gearbox.

A gearbox according to the invention is suitable especially where there is a need for high gear ratios, high effectivity, high torque overload capacity, small build-in dimensions, especially in a longitudinal direction, long service life, noiseless run, undemanding servicing and maintenance, small production costs and where there are increased hygienic and work safety demands.

A gearbox according to the invention has been functionally checked for 650 hours with a full load. It was coupled to a driving gear with a power demand of 0.25 kW, input operating speed 1480 revolutions in a minute, the gear ratio being 29:1. Outer diameter of a case 7 was 280 mm and the gearbox has axial dimension 48 mm when using two planet wheels 3 and only 36 mm when using one planet wheel 3.

We claim:

1. A cycloidal gearbox for direct coupling of a drive shaft and a driven body, comprising:
   a gearbox case,
   a driving element including: one or more eccentrics fixedly connected to said drive shaft, each said eccentric having an outer circumference; one or more disk-shaped planet wheels, each planet wheel corresponding to an eccentric, each planet wheel having an axially centered hole to be maintained in contact with the corresponding eccentric outer circumference, each planet wheel having an outer circumference comprising teeth formed in a regular pattern in the shape of a closed cycloid, and each planet wheel having a plurality of axial holes arranged on a second pitch circle;
   a plurality of pins rigidly connected to said gearbox case and axially oriented in a regular pattern on a first pitch circle, said planet wheel teeth engaging with said plurality of pins and said plurality of pins being of a number one greater than the number of planet wheel teeth;
   and a driven body including: a ring arranged radially outward from and surrounding the outer circumference of said one or more planet wheels, said ring rotatably seated in a bearing, and surrounded by a flange connected rigidly to an outer section of said gearbox case; and a plurality of pins, arranged on said second pitch circle, rigidly connected to said driven body and passing through said plurality of axial holes in each planet wheel.

2. A gearbox according to claim 1, characterized in that said bearing is a rolling-contact bearing.

3. A gearbox according to claim 1, characterized in that on an outer circumference of the driven body and adjoining an inner surface of said gearbox case and in two sidewalls of a driven body the axial direction and adjoining walls on said inner surface of the gearbox case, are arranged recesses, preferably in the form of annular grooves, in which rolling-contact elements of a bearing are arranged.

4. A gearbox according to claim 1, characterized in that said driven body is also an output member of said gearbox.

5. A gearbox according to claim 1, characterized in that said gearbox case is directly coupled to said driving motor, the output part of a driving motor being preferably directly engaged with an eccentric.

6. A gearbox according to claim 3, characterized in that said driven body is also an output member of said gearbox.

7. A gearbox according to claim 4, characterized in that said gearbox case is directly coupled to a flange of a driving motor, the output part of said driving motor being directly engaged with an eccentric.

* * * * *

UNITED STATES PATENT AND TRADEMARK OFFICE
CERTIFICATE OF CORRECTION

PATENT NO. : 5,167,590
DATED     : December 1, 1992
INVENTOR(S) : Ervin KRATOCHVIL et al It is certified that error appears in the above-identified patent and that said Letters Patent is hereby corrected as shown below:

Column 4, claim 3, line 33, "a" should be --the-- and after "body" insert --in--.

Column 4, claim 5, line 42, delete second occurrence of "said" and insert --a flange of a--;
　　　　　　　　　line 43, "a" should be --said--;
　　　　　claim 5, lines 43 and 44 delete "preferably".

Signed and Sealed this

Twenty-third Day of November, 1993

Attest:

BRUCE LEHMAN

Attesting Officer　　　Commissioner of Patents and Trademarks